(12) United States Patent
Coqueret et al.

(10) Patent No.: US 9,051,408 B2
(45) Date of Patent: Jun. 9, 2015

(54) CURABLE COMPOSITIONS ALLOWING TO OBTAIN MATERIALS HAVING AN OPTIMISED PERFORMANCE, AND MATERIALS OBTAINED FROM SAID COMPOSITIONS

(71) Applicants: Astrium SAS, Paris (FR); Universite de Reims Champagne-Ardenne, Reims Cedex (FR)

(72) Inventors: Xavier Coqueret, Reims (FR); Mickael Krzeminski, Le Bouscat (FR); Brigitte Defoort, Saint Medard en Jalles (FR)

(73) Assignees: Astrium SAS, Paris (FR); Universite De Reims Champagne-Ardenne, Reims Cedex (FR); Centre National De La Recherche Scientifique, Paris (FR)

( * ) Notice: Subject to any disclaimer, the term of this patent is extended or adjusted under 35 U.S.C. 154(b) by 0 days.

(21) Appl. No.: 14/362,899

(22) PCT Filed: Dec. 4, 2012

(86) PCT No.: PCT/EP2012/074367
§ 371 (c)(1),
(2) Date: Jun. 4, 2014

(87) PCT Pub. No.: WO2013/083567
PCT Pub. Date: Jun. 13, 2013

(65) Prior Publication Data
US 2014/0336341 A1 Nov. 13, 2014

(30) Foreign Application Priority Data

Dec. 5, 2011 (FR) ...................................... 11 61154

(51) Int. Cl.
*C08G 18/81* (2006.01)
*C08L 35/06* (2006.01)
(Continued)

(52) U.S. Cl.
CPC ............. *C08F 283/06* (2013.01); *C08F 220/20* (2013.01); *C08F 222/1006* (2013.01); *C08F 226/06* (2013.01); *C09J 4/06* (2013.01)

(58) Field of Classification Search
CPC ...................................... C08F 226/06
USPC ........................................... 525/534
See application file for complete search history.

(56) References Cited

U.S. PATENT DOCUMENTS 5,932,625 A * 8/1999 Watanabe et al. ............... 522/33
2001/0053820 A1* 12/2001 Yeager et al. .................. 525/186
(Continued)

FOREIGN PATENT DOCUMENTS

EP     1 473 325 A1   11/2004
FR     2 951 179 A1   4/2011
(Continued)

OTHER PUBLICATIONS

International Search Report dated Jan. 16, 2013 for International Application No. PCT/2012/074367.
(Continued)

*Primary Examiner* — Mike M Dollinger
(74) *Attorney, Agent, or Firm* — Miles & Stockbridge P.C.

(57) ABSTRACT

A curable composition, and a material obtained by curing the composition, in which the curable composition includes a vinylester polymerisable compound, jointly with a sulphonated polyaromatic thermoplastic polymer, and an N-vinyl lactam, and which is characterised in that it further includes, a first non-vinylester polymerisable compound which includes at least one isocyanurate group bearing at least two (meth)acrylate groups; and a second non-vinylester polymerisable compound which includes at least one carbopolycyclic or heteropolycyclic group bearing at least two (meth)acrylate groups.

15 Claims, 4 Drawing Sheets

(51) Int. Cl.
*C08G 18/68* (2006.01)
*C08F 2/44* (2006.01)
*C08F 283/06* (2006.01)
*C09J 4/06* (2006.01)
C08F 220/20 (2006.01)
C08F 222/10 (2006.01)
C08F 226/06 (2006.01)

(56) References Cited

U.S. PATENT DOCUMENTS

2008/0254229 A1* 10/2008 Lake .............................. 427/508
2011/0172359 A1* 7/2011 Panther ......................... 524/854
2012/0277383 A1* 11/2012 Krzeminski et al. .......... 525/535

FOREIGN PATENT DOCUMENTS

JP          2001 329027 A      11/2001
WO     WO 2011/042554 A1      4/2011

OTHER PUBLICATIONS

French Search Report dated Sep. 5, 2012 for French Application No. 1161154.
Database WPI Week 200220, Thomson Scientific, London, GB; An 2002-151753—XP00262858.

* cited by examiner

CURABLE COMPOSITIONS ALLOWING TO OBTAIN MATERIALS HAVING AN OPTIMISED PERFORMANCE, AND MATERIALS OBTAINED FROM SAID COMPOSITIONS

TECHNICAL FIELD

The present invention relates to the field of curable compositions for industrial use.

More specifically, it relates to a curable composition able to produce, after curing, materials which provide an excellent compromise between toughness, performance at high temperatures and moisture resistance.

It also relates to a material obtained by curing this composition.

This material can in particular be a material forming the matrix of a composite material.

However, it can also be an adhesive material enabling parts to be assembled to one another and, in particular, parts made of composite materials.

The invention can therefore find applications in all sorts of industry and, more specifically, in the aeronautics, space, rail, naval and motor vehicle industries, for example for the manufacture and assembly of structural parts, engine parts, cabin parts, or bodywork parts, in the arms industry, for example for the manufacture and assembly of missiles or of missile launchers, or again in the field of leisure and sport, for example for the manufacture and assembly of items intended for water sports and board sports.

STATE OF THE PRIOR ART

Composite materials enable the exceptional mechanical properties of certain materials, which it is not known how to manufacture in massive form, but only in the form of filaments, to be exploited. Matrices formed of organic polymers are then used to bind the filaments to one another.

These matrices are typically obtained from compositions which are conventionally called "thermosetting resins" (although some of them can be cured under the effect of treatment other than heat), and which include monomers, oligomers and/or prepolymers capable of causing, by polymerisation/reticulation, the formation of an infusible and insoluble material.

If it is desired to obtain composite materials with high performance specifications, it is essential that the matrices themselves have satisfactory mechanical properties.

In general, however, matrices obtained from thermosetting resins and, in particular, from vinylester resins, have a toughness, i.e. an impact resistance, which is mediocre.

A number of solutions have been proposed to improve the toughness of a composite material the matrix of which is obtained from a vinylester resin.

In particular, it has been proposed in the PCT international application published as number WO 2011/042554 (reference [1]) to incorporate, in a curable composition including a vinylester monomer, a sulphonated polyaromatic thermoplastic polymer by dissolving this monomer and this polymer in a reactive diluent in which both are soluble, for example an N-vinyl lactam. By this means it is possible to obtain materials which have a toughness greater than 2.20 $MPa.m^{1/2}$, which was previously considered impossible in the field of vinylester resin-based materials.

However, in producing a composite material toughness is not the only criterion which must be taken into account.

Indeed, it is also necessary to take account of the change of the material in its environment and, in particular, its performance at high temperatures, for example if this material is intended to be used to manufacture structural or engine parts for aircraft or rockets engines, and also to take account of its moisture resistance.

Account must also be taken of the material's ease of use on an industrial scale and, in particular, of the viscosity which the curable composition has at the temperatures at which this material will be used. Thus, for example, in the case of an industrial use of a composite material involving an injection operation, this use is particularly restrictive since the curable composition has a high viscosity and consequently requires that it is heated to high temperatures to make its viscosity compatible with an injection.

And experience proves that it is extremely difficult to obtain from vinylester resins materials having very satisfactory properties at once in terms of toughness, performance at high temperatures and moisture resistance since, when one of the properties of a material, such as toughness, is improved by adding an additional constituent to the resins, another property of this material is generally degraded.

The Inventors therefore set themselves the goal of providing curable compositions made from a vinylester resin which, after curing, allow materials to be obtained providing an excellent compromise between toughness, performance at high temperatures and moisture resistance.

They also set themselves the goal that these curable compositions should have a viscosity enabling the composite materials to be used on an industrial scale, including by techniques involving an injection operation such as, for example, moulding by simultaneous injection, or moulding by low-pressure injection of resin.

They also set themselves the goal that these curable compositions should be able to be prepared by using only commercially available components.

DESCRIPTION OF THE INVENTION

These goals are attained by the invention, which proposes a curable composition comprising a vinylester polymerisable compound, jointly with a sulphonated polyaromatic thermoplastic polymer, and an N-vinyl lactam, and which is characterised in that it further comprises:
- a first non-vinylester polymerisable compound, or compound 1, which comprises at least one isocyanurate group bearing at least two (meth)acrylate groups; and
- a second non-vinylester polymerisable compound, or compound 2, which comprises at least one carbopolycyclic or heteropolycyclic group bearing at least two (meth)acrylate groups.

In the foregoing and in what follows, a "polymerisable compound" is understood to be a compound which is capable of undergoing a polymerisation/reticulation reaction through the presence of at least two reactive sites that it comprises, whether under the effect of heat, of light (visible light, UV or IR), of ionising radiation (electron beam, β or γ radiation, X rays, etc.), of an oxidation-reduction reaction or of any other means. This compound can therefore take the form of a monomer, an oligomer or a prepolymer resulting from polymerisation of this monomer, or again the form of a blend thereof.

The term "vinylester compound" is understood to mean a monomer which has been obtained by reaction between an epoxide compound and an unsaturated carboxylic acid (typically acrylic acid or methacrylic acid), or again an oligomer or a prepolymer resulting from polymerisation of this monomer, or again a blend of these. Such compounds, which are also known by the name "epoxyvinylester compounds", are described in particular in the monograph entitled "*Vinylester resins*" of Techniques de l'Ingénieur, Plastics and Composites Treatise, volume AM 3450 (reference [2]).

In addition, the term "carbopolycyclic group" is understood to mean a group the cyclic part of which is formed by at least two condensed cycles, the cycles of which consist solely of carbon atoms, while the term "heteropolycyclic group" is understood to mean a group the cyclic part of which is formed by at least two condensed cycles, at least one of which includes at least one heteroatom, i.e. an atom other than a carbon atom, typically chosen from among nitrogen, oxygen and sulphur.

As for the expression "(meth)acrylate group", it designates equally an acrylate group or a methacrylate group, i.e. a group of the following formula: —O—C(O)—C(R)=CH$_2$, in which R can be either a hydrogen atom or a methyl group.

In accordance with the invention, the vinylester polymerisable compound preferentially comprises at least one bisphenolic unit A and/or one novolac unit and is therefore, preferably, chosen from among:
- the bisphenol A vinylester resins such as, for example, those sold by the company SARTOMER with the reference SR 601E, by the company CYTEC with the reference Ebecryl™ 600;
- the halogenated bisphenol A vinylester resins such as, for example, those sold by the company DOW Chemicals with the references Derakane™ DER 510A-40 and 510C-350;
- the novolac vinylester resins such as, for example, those sold by the company CYTEC with the reference Ebecryl™ 609; and
- the mixed vinylester resins, comprising at once bisphenolic A units and novolac units such as, for example, those sold by the company DSM Composite Resins with the reference Atlac™ 430.

However, this can also relate to a vinylester polymerisable compound which does not comprise either a bisphenolic A unit or a novolac unit such as, for example, an urethane acrylate resin.

In the most preferred manner, the vinylester polymerisable compound is an epoxidised bisphenol A diacrylate monomer of formula (I) below:

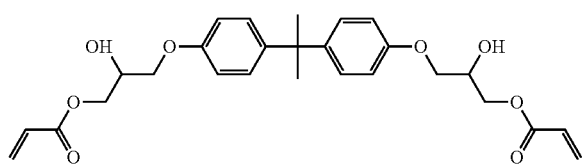

(I)

or an oligomer or a prepolymer resulting from a polymerisation of this monomer, or again a blend thereof. Such a compound is notably available from the company CYTEC with the reference Ebecryl™ 600.

The sulphonated aromatic thermoplastic polymer is, preferably, chosen from among the polysulfones, the polyethersulfones and the polyphenylsulfones such as, for example, those sold by the company SOLVAY Advanced Polymers with the references Udel™ (polysulfones), Veradel™ and Virantage™ (polyethersulfones) and Radel™ (polyphenylsulfones).

Among these polymers, the polyethersulfones such as, for example, the one sold by the company SOLVAY Advanced Polymers with the reference Virantage™ VW-10700 RFP, are particularly preferred.

The N-Vinyl lactam is preferably chosen from among N-vinyl-2-pyrrolidone, N-vinyl-2-piperidone and N-vinyl caprolactam, and N-vinyl-2-pyrrolidone is very particularly preferred.

Furthermore, compound 1 is preferably the monomer of formula (II) below:

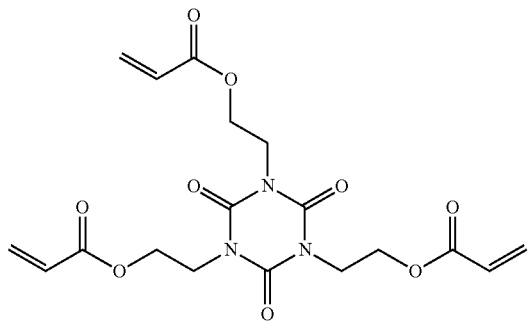

(II)

or an oligomer or a prepolymer resulting from a polymerisation of this monomer, or again a blend thereof. This monomer is known by the name tris-(2-hydroxyethypisocyanurate triacrylate and is available from the company SARTOMER with the reference SR 368.

As for compound 2, for its part it is preferably a monomer of formula (III) below:

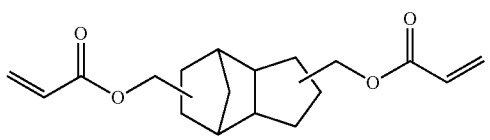

(III)

or an oligomer or a prepolymer resulting from a polymerisation of this monomer, or again a blend thereof. This monomer is known by the name tricyclodecane dimethanol-diacrylate and is available from the company SARTOMER with the reference SR 833S.

In a preferred embodiment of the invention, the curable composition has the following qualitative and quantitative formulation, expressed by mass percentages:
- 33±5% of the epoxidised bisphenol A diacrylate monomer of formula (I) above, or of an oligomer or of a prepolymer resulting from a polymerisation of this monomer, or again of a blend thereof;
- 10±3% of a polyethersulfone;
- 15±3% of N-vinyl-2-pyrrolidone;
- 40±5% of the monomer of formula (II) above, or of an oligomer or of a prepolymer resulting from a polymerisation of this monomer, or again of a blend thereof; and
- 2±1.5% of the monomer of formula (III) above, or of an oligomer or of a prepolymer resulting from a polymerisation of this monomer, or again of a blend thereof.

Even more preferably, the curable composition has the following qualitative and quantitative formulation, expressed as mass percentages:

33±1% of the epoxidised bisphenol A diacrylate monomer of formula (I) above, or of an oligomer or of a prepolymer resulting from a polymerisation of this monomer, or again of a blend thereof;

10±1% of a polyethersulfone;

15±1% of N-vinyl-2-pyrrolidone;

40±1% of the monomer of formula (II) above, or of an oligomer or of a prepolymer resulting from a polymerisation of this monomer, or again of a blend thereof; and 2±1% of the monomer of formula (III) above, or of an oligomer or of a prepolymer resulting from a polymerisation of this monomer, or again of a blend thereof.

Such a curable composition indeed produces, after curing, a material which provides an excellent compromise between roughness, performance at high temperatures and moisture resistance, since it has at once a hardness greater than 1.4 $MPa.m^{1/2}$ (as determined by standard ISO 13586:2000), a glass transition temperature of over 180° C. and a moderate sensitivity to moisture.

It also has a viscosity enabling its use to be envisaged in many techniques used for industrial implementation of composite materials and, in particular, those involving an injection operation.

Another object of the invention is a material which is characterised in that it is obtained by curing a curable composition as defined above.

In accordance with the invention, this material is, preferably, either an adhesive assembling parts with one another, and, in particular, parts made of composite material(s), or a material forming the matrix of a composite material of the type which includes a matrix in which there is a reinforcement.

The reinforcement present in this composite material can be of different types. In particular, it can be a reinforcement consisting of glass fibres, quartz fibres, carbon fibres; graphite fibres, silica fibres, metal fibres such as steel fibres, aluminium fibres or boron fibres, organic fibres such as aramid fibres, polyethylene fibres, polyester fibres or fibres of poly (p-phenylene benzobisoxazole), more commonly known by the acronym PBO, or again silicon carbide fibres.

This reinforcement can, depending on the nature of the fibres which constitute it, take the form of cut wires, ground fibres, mats made of continuous filaments, mats with cut filaments, rovings, fabrics, knits, felts, etc., or again the form of complexes produced by associating different types of flat materials.

Furthermore, the composite material can be manufactured by all techniques known to those skilled in the art of composite materials such as, for example, impregnation, molding by simultaneous injection, molding by autoclave drape forming, vacuum molding, low resin pressure injection molding (or RTM for "Resin Transfer Molding"), low-pressure "wet" cold press molding, compound injection molding (or BMC for "Bulk Molding Compound"), compression molding of prepreg mats (or SMC for "Sheet Molding Compound"), filament winding, centrifugation, or again by pultrusion.

Another object of the invention is a composite material which includes a matrix containing a reinforcement, which is characterised in that the matrix is obtained by curing a curable composition as defined above.

The invention will be better understood on reading the additional description which follows, which describes the procedure followed by the Inventors to develop a curable composition which produces, after curing, a material with optimised properties in terms of toughness, performance at high temperatures and moisture resistance.

This additional description is given with reference to the appended figures.

Clearly, it represents only one illustration of the object of the invention, and does not seek in any circumstances to limit this object.

In the following:

the acronym PES designates the polyethersulfone which is sold by the company SOLVAY Advanced Polymers with the reference Virantage™ VW-10700 RFP;

the acronym NVP designates N-vinyl-2-pyrrolidone;

the acronym EPAC designates the oligomer epoxidised bisphenol A diacrylate which is sold by the company CYTEC with the reference Ebecryl™ 600;

the acronym TTHEC designates the monomer tris-(2-hydroxyethyl) isocyanurate triacrylate which is sold by the company SARTOMER with the reference SR 368; while the acronym DTCD designates the monomer tricyclodecane dimethanol-diacrylate which is sold by the company SARTOMER with the reference SR 833S.

BRIEF DESCRIPTION OF THE FIGURES

FIG. 1A is for a DTCD mass fraction of 0.10; FIG. 1B is for a DTCD mass fraction of 0.05, while FIG. 1C is for a DTCD mass fraction of 0.00.

FIG. 2A is for a DTCD mass fraction of 0.10; FIG. 2B is for a DTCD mass fraction of 0.050, while FIG. 2C is for a DTCD mass fraction of 0.00.

FIG. 3A is for a DTCD mass fraction of 0.10; FIG. 3B is for a DTCD mass fraction of 0.05, while FIG. 3C is for a DTCD mass fraction of 0.00.

FIG. 4A is for a DTCD mass fraction of 0.10; FIG. 4B is for a DTCD mass fraction of 0.05, while FIG. 4C is for a DTCD mass fraction of 0.00.

Figure 1A:
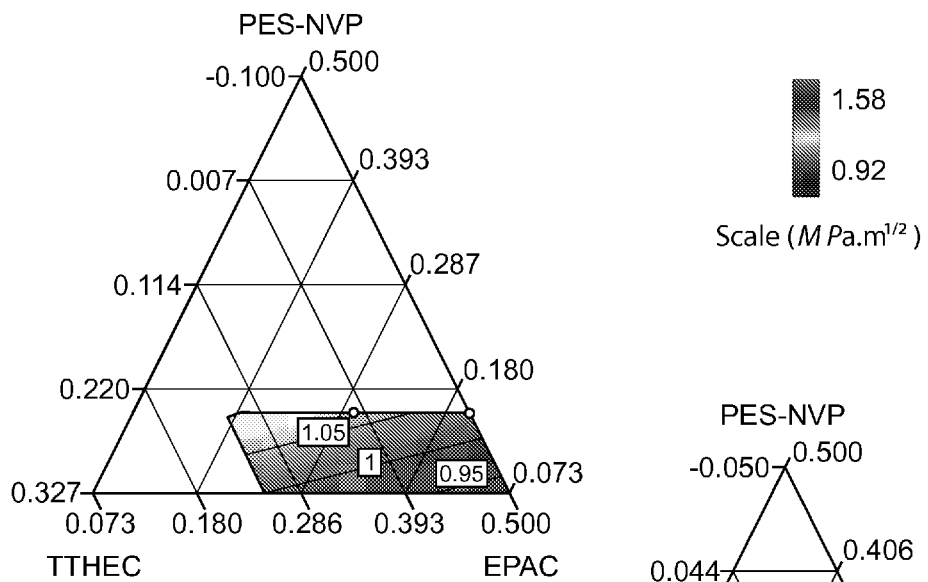
FIGS. 1A, 1B and 1C show the projections, with a fixed DTCD mass fraction, on ternary PES-NVP/EPAC/TTHEC diagrams, of the response surface of the roughness of materials obtained from curable compositions consisting of a PES/NVP/EPAC/TTHEC/DTCD blend.

In each of FIGS. 1A to 4C, the black points correspond to experimental results.

DETAILED ACCOUNT OF A PARTICULAR EMBODIMENT

Twenty compositions, called hereinafter compositions 1 to 20, were firstly prepared by using:

EPAC as the vinylester compound;

PES as the sulphonated polyaromatic thermoplastic polymer;

NVP as the N-vinyl lactam;

TTHEC as compound 1; and

DTCD as compound 2.

These compositions were prepared by firstly dissolving the PES in the NVP, with a NVP/PES mass ratio of 1.575, at a temperature of approximately 70° C., with constant mechanical stirring.

After this, the DTCD and the EPAC were added in succession to the PES-NVP blend obtained in this manner, heated to 50° C.

Table I below shows the mass EPAC fractions, as a PES-NVP blend, as TTHEC and as DTCD, used for each of compositions 1 to 20.

TABLE I

| | Constituents | | | |
|---|---|---|---|---|
| Compositions | EPAC | PES-NVP | TTHEC | DTCD |
| 1  | 0.273 | 0.245 | 0.383 | 0.100 |
| 2  | 0.155 | 0.245 | 0.500 | 0.100 |
| 3  | 0.287 | 0.262 | 0.426 | 0.025 |
| 4  | 0.423 | 0.327 | 0.250 | — |
| 5  | 0.248 | 0.327 | 0.375 | 0.050 |
| 6  | 0.440 | 0.245 | 0.265 | 0.050 |
| 7  | 0.173 | 0.327 | 0.500 | — |
| 8  | 0.073 | 0.327 | 0.500 | 0.100 |
| 9  | 0.255 | 0.245 | 0.500 | — |
| 10 | 0.368 | 0.279 | 0.353 | — |
| 11 | 0.346 | 0.303 | 0.301 | 0.050 |
| 12 | 0.164 | 0.286 | 0.500 | 0.050 |
| 13 | 0.500 | 0.250 | 0.250 | — |
| 14 | 0.073 | 0.327 | 0.500 | 0.100 |
| 15 | 0.362 | 0.289 | 0.250 | 0.100 |
| 16 | 0.362 | 0.289 | 0.250 | 0.100 |
| 17 | 0.255 | 0.245 | 0.500 | — |
| 18 | 0.173 | 0.327 | 0.500 | — |
| 19 | 0.196 | 0.303 | 0.426 | 0.075 |
| 20 | 0.423 | 0.327 | 0.250 | — |

Compositions 1 to 20 were then poured into steel molds measuring 200 mm in width and length, and 5 mm in height, degassed in a vacuum to eliminate the air trapped during pouring, and then polymerised/reticulated by ionisation in an electron beam (CIRCE II Accelerator—10 MeV—of the company LINAC Technologies) with doses of 230 kGy (1×10 kGy pass, followed by one 20 kGy pass, followed by 4×50 kGy passes).

The materials obtained in this manner were subjected to tests to determine their toughness, their glass transition temperature and their hygroscopicity, and to assess their ageing resistance in a moist environment.

Toughness:

The toughness quantified by determining the critical stress intensity factor, noted $K_{Ic}$, of the materials was determined by tests which were undertaken in accordance with standard ISO 13586:2000 which determines the methods for testing toughness of plastic materials according to the crack opening mode (mode I).

Since this standard provides two types of tests, i.e. three-point bending tests and traction tests, the toughness tests were undertaken by three-point bending tests due to greater ease with which the test samples can be machined.

These three-point bending tests were undertaken as described in the European application published as number 1 473 325 (reference [3]).

Glass Transition Temperature:

The glass transition temperature, noted $T_g$, was determined by dynamic thermo-mechanical analyses (DMA), since this technique has, indeed, the advantage that it subjects the analysed materials only to very small deformations and, hence, that it does not modify their structure.

The DMA analyses were undertaken by means of a Q800 of the company TA Instruments, in doubly-recessed bending mode, using the following operating conditions: stress frequency: 1 Hz; stress amplitude: 30 μm; temperature range: 25 to 300° C. with a gradient of 3° C./min.

Hygroscopicity:

The hygroscopicity of the materials was determined by immersing these materials for 48 hours in water kept at 80° C., and by calculating the relative mass increase of the materials following this immersion.

This relative mass increase, noted RMI, is equal to the ratio $(m_{48}-m_0)/m_0$, where $m_{48}$ is the mass exhibited by a material after immersion in water, while $m_0$ is the mass of the same material before immersion in water.

Ageing Resistance in a Moist Environment:

Ageing resistance in a moist environment of the materials was assessed by determining the glass transition temperature of the materials after they had been immersed for 48 hours in water. This glass transition temperature is noted moist Tg.

It was determined by DMA analyses which were undertaken with the same equipment, and under the same conditions as those used for measuring Tg.

Results:

The results of these tests are shown in table II below.

TABLE II

| | Properties of the materials obtained | | | |
|---|---|---|---|---|
| Compositions | $K_{Ic}$ (MPa·m$^{1/2}$) | $T_g$ (° C.) | RMI (% by mass) | Moist $T_g$ (° C.) |
| 1  | 0.92 | 193.80 | 4.23 | 138.31 |
| 2  | 1.16 | 201.92 | 4.35 | 154.71 |
| 3  | —    | 189.36 | 4.38 | 139.47 |
| 4  | 1.52 | 177.57 | 4.01 | 118.88 |
| 5  | 1.30 | 195.44 | 4.65 | 137.69 |
| 6  | —    | 175.67 | 3.39 | — |
| 7  | 1.31 | 202.40 | 5.26 | 139.44 |
| 8  | —    | 214.69 | 4.46 | — |
| 9  | —    | 191.17 | 4.52 | — |
| 10 | 1.58 | 185.89 | 3.32 | 133.81 |
| 11 | 1.21 | 186.12 | — | — |
| 12 | —    | 197.92 | — | — |
| 13 | —    | 167.88 | — | — |
| 14 | —    | 208.18 | — | — |
| 15 | —    | 180.59 | — | — |
| 16 | —    | 181.56 | — | — |
| 17 | —    | 187.64 | — | — |
| 18 | —    | 199.97 | — | — |
| 19 | —    | 198.79 | — | — |
| 20 | —    | 177.93 | — | — |

Figure 1B:
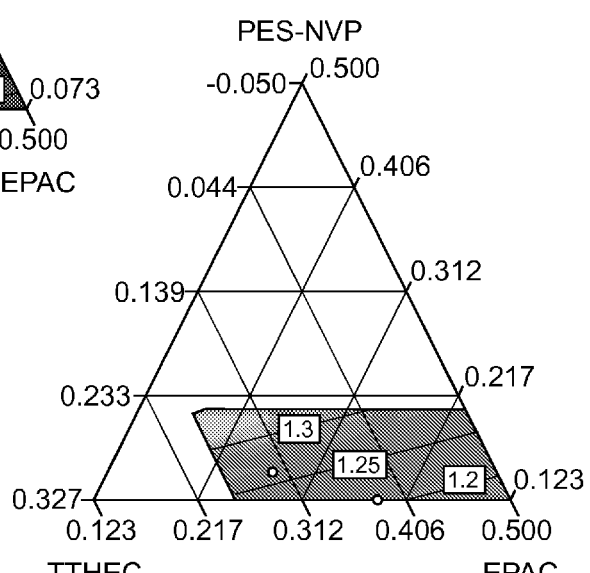
Figure 1C:
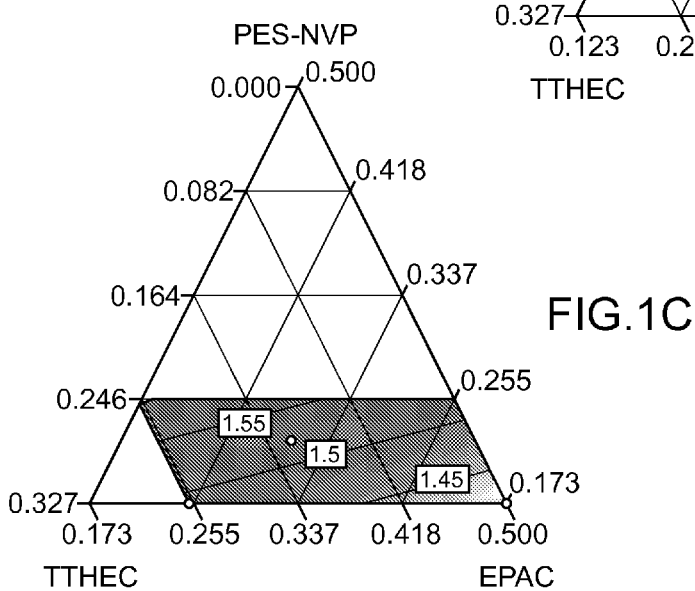
Figure 2A:
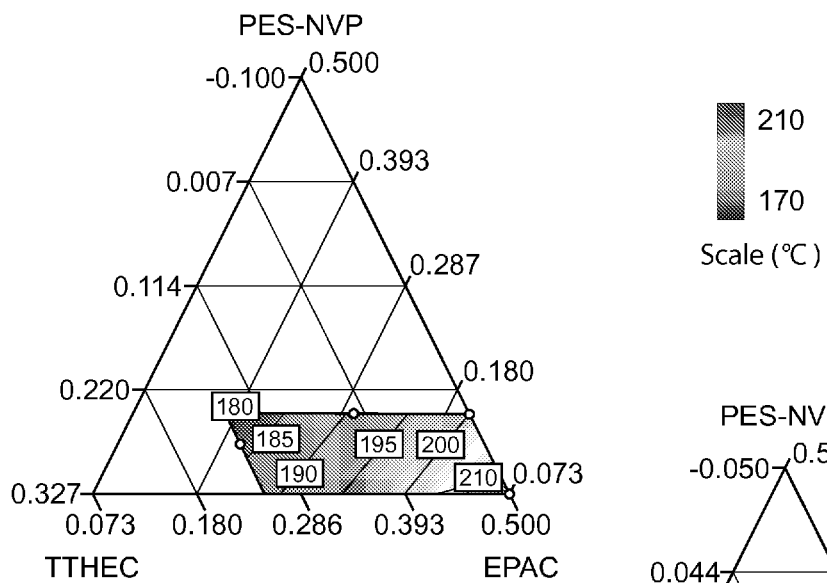
FIGS. 2A, 2B and 2C show the projections, with a fixed DTCD mass fraction, on ternary PES-NVP/EPAC/TTHEC diagrams, of the response surface of the glass transition temperature of materials obtained from curable compositions consisting of a PES/NVP/EPAC/TTHEC/DTCD blend.
Figure 2B:
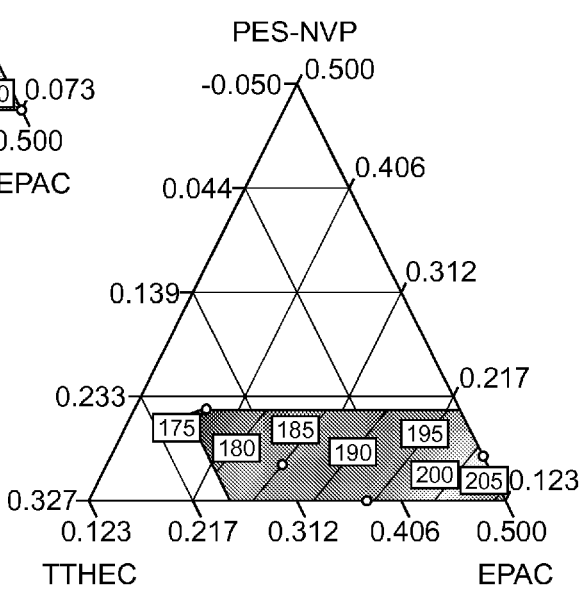
Figure 2C:
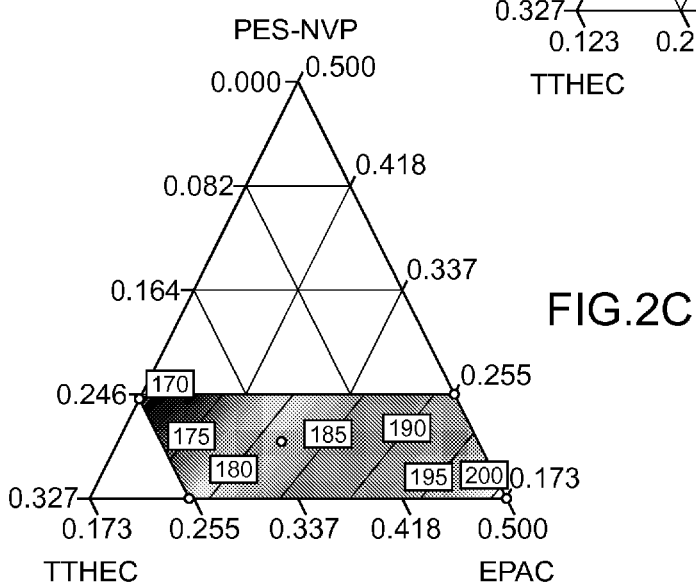
Figure 3A:
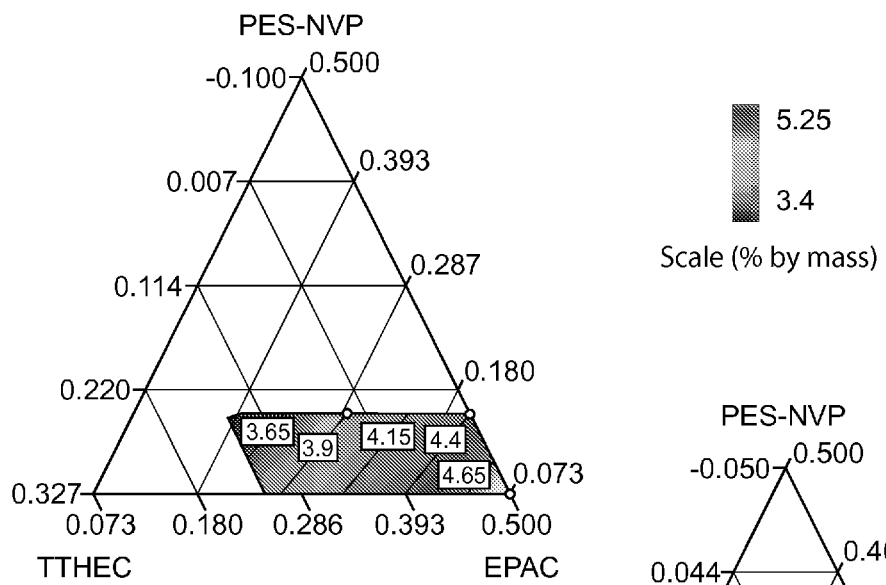
FIGS. 3A, 3B and 3C show the projections, with a fixed DTCD mass fraction, on ternary PES-NVP/EPAC/TTHEC diagrams, of the response surface of the relative mass increase exhibited by materials obtained from curable compositions consisting of a PES/NVP/EPAC/TTHEC/DTCD blend, after immersion for 48 hours in hot water.
Figure 3B:
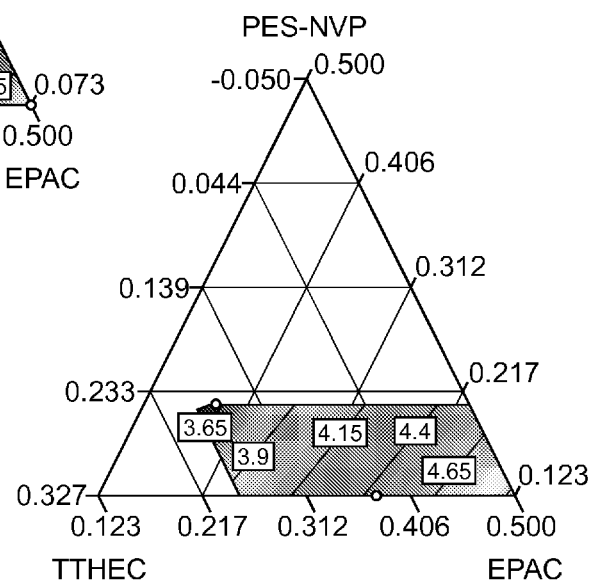
Figure 3C:
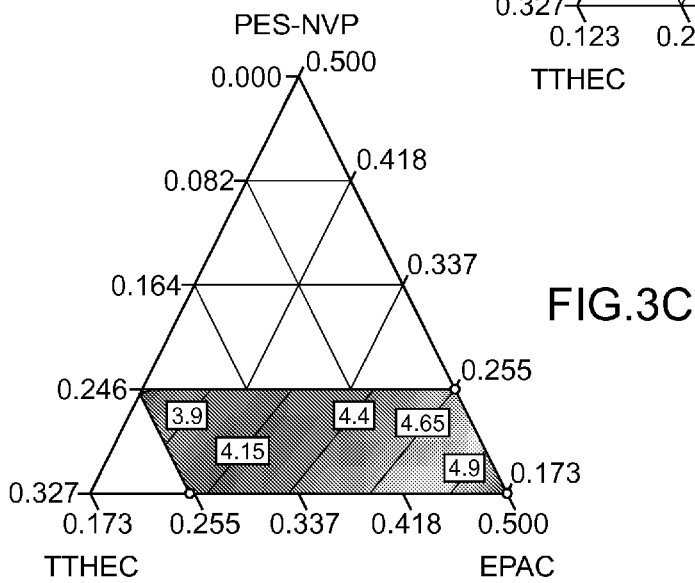

By fixing the DTCD mass fraction (since this mass fraction varies only between 0.00 and 0.10), these experimental results enabled the projections shown FIGS. 1A to 4C to be established, in which:

FIGS. 1A to 1C are the projections of the response surface of $K_{Ic}$;

FIGS. 2A to 2C are the projections of the response surface of Tg;

FIGS. 3A to 3C are the projections of the response surface of RMI; while

Figure 4A:
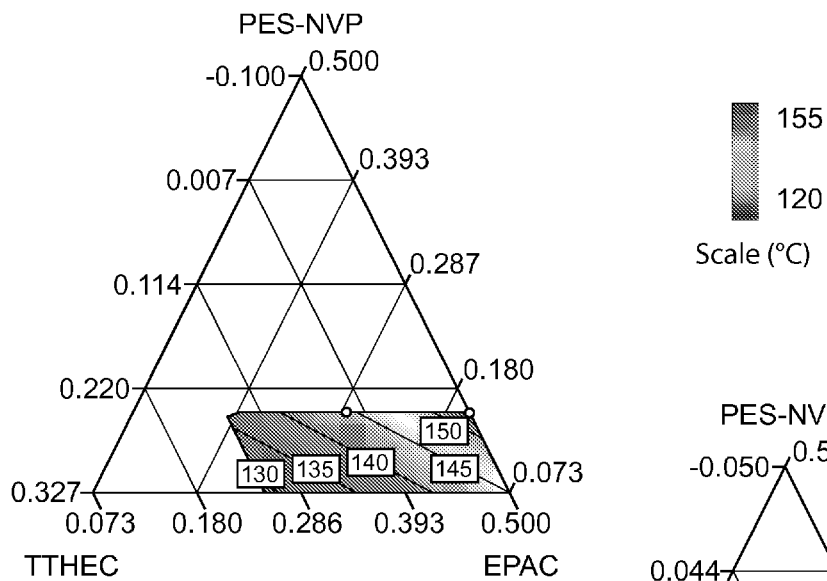
FIGS. 4A, 4B and 4C show the projections, with a fixed DTCD mass fraction, on ternary PES-NVP/EPAC/TTHEC diagrams, of the response surface of the glass transition temperature exhibited by materials obtained from curable compositions consisting of a PES/NVP/EPAC/TTHEC/DTCD blend, after immersion for 48 hours in hot water.
Figure 4B:
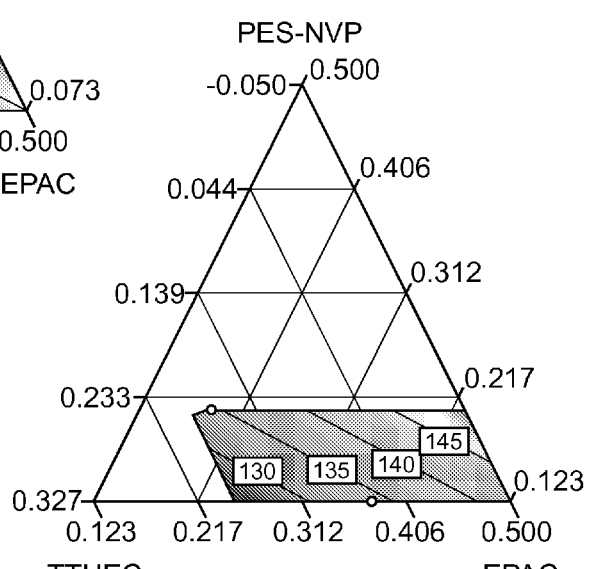
Figure 4C:
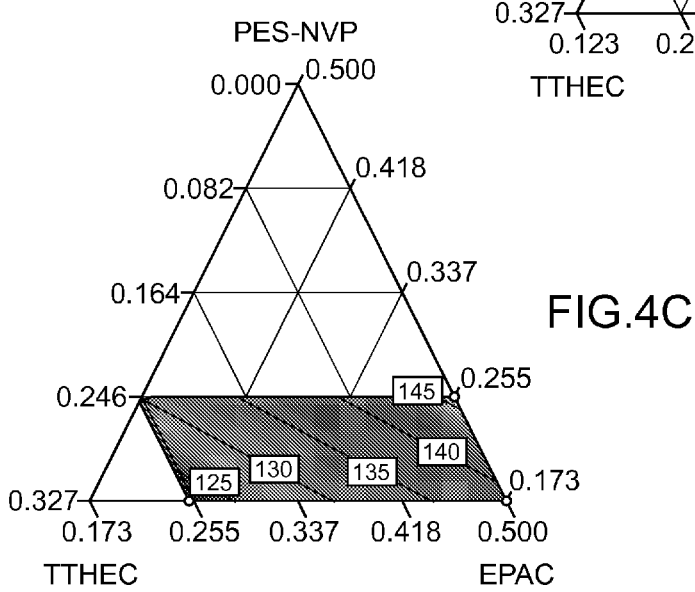

FIGS. 4A to 4C are the projections of the response surface of moist Tg;

In their turn, these projections enabled the influence of each constituent on each of the properties analysed to be assessed from a qualitative standpoint, as reported in table III below.

TABLE III

| Properties | Constituents | | | |
|---|---|---|---|---|
| | EPAC | PES-NVP | TTHEC | DTCD |
| $K_{Ic}$ | + | ++ | − | −− |
| Tg | −− | + | ++ | + |
| RMI | + | −− | − | ++ |
| Moist Tg | + | −− | + | − |

It can be seen from this table that:
EPAC contributes moderately to the toughness of the materials, has an unfavourable influence on their glass transition temperature, but has, conversely, a favourable influence on their properties under moist conditions;
the PES-NVP blend has a favourable influence on the toughness and the glass transition temperature of the materials (before immersion in hot water), but is responsible for a degradation of their properties in moist conditions PMR and moist Tg), which is not truly surprising, bearing in mind the hydrophilicity of NVP;
TTHEC improves the glass transition temperature appreciably, but contributes to the take-up of water, while
DTCD has an unfavourable influence on the toughness, but improves the glass transition temperature and, above all, greatly limits the take-up of water.

On the basis of these elements, using the Design-Expert™ V7.1.5 application retailed by the company Stat-Ease, a curable composition was able to be defined which, after curing, can produce a material with optimised properties, i.e. a material having the following goals:

a $K_{Ic}$ ranging from 1.2 to 1.6 MPa.m$^{1/2}$;
a Tg ranging from 170 to 215° C.;
a RMI ranging from 3.4 to 4.5% by mass; and
a moist Tg ranging from 130 to 155° C.

This curable composition has the following qualitative and quantitative composition, expressed as mass fractions:
EPAC: 0.330 (i.e. 33.0% by mass);
PES: 0.097 (i.e. 9.70% by mass);
NVP: 0.153 (i.e. 15.3% by mass);
TTHEC: 0.400 (i.e. 40.0% by mass); and
DTCD: 0.023 (i.e. 23.0% by mass);
and, after curing, produces a material which has a $K_{Ic}$ of 1.44±0.21 MPa.m$^{1/2}$, a Tg of 184±3° C., a RMI of 4.2±0.3 by mass and a moist Tg of 138±5° C.

These values of $K_{Ic}$, Tg, PMR and moist Tg do indeed satisfy the goals sought.

Furthermore, this curable composition has a viscosity which is slightly less than 100 Pa.s at 25° C., making it suitable for use in many techniques for implementing composite materials, including techniques involving an injection operation such as molding by simultaneous injection, or molding by low-pressure injection.

References Cited
[1] WO-A-2011/042554
"Résines vinylesters [Vinylester resins]", Techniques de l'Ingénieur, Plastics and Composites Treatise, volume AM 3450
EP-A-1 473 325

The invention claimed is:
1. A curable composition, comprising:
a vinylester polymerisable compound, jointly with a sulphonated polyaromatic thermoplastic polymer and an N-vinyl lactam,
wherein the composition further comprises
a first non-vinylester polymerisable compound which comprises at least one isocyanurate group bearing a at least two (meth)acrylate groups; and
a second non-vinylester polymerisable compound which comprises at least one carbopolycyclic or heteropolycyclic group bearing at least two (meth)acrylate groups.
2. The curable compound according to claim 1, wherein the vinylester polymerisable compound is chosen from among bisphenol A vinylester resins, halogenated bisphenol A vinylester resins, novolac vinylester resins, and vinylester resins comprising at once bisphenolic A units and novolac units.
3. The curable composition according to claim 2, wherein the vinylester polymerisable compound is an epoxidised bisphenol A diacrylate monomer of formula below (I):

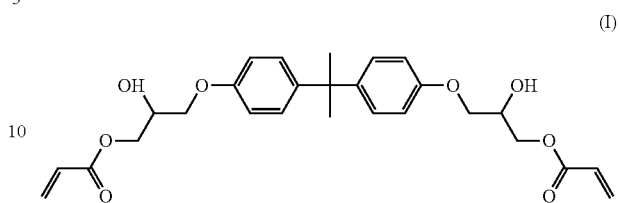

(I)

or an oligomer or a prepolymer resulting from a polymerisation of this monomer, or again a blend thereof.
4. The curable compound according to claim 1, wherein the sulphonated polyaromatic thermoplastic polymer is a polysulfone.
5. The curable composition according to claim 4, wherein the polysulfone is a polyethersulfone.
6. The curable composition according to claim 1, wherein the N-vinyl lactam is chosen from among N-vinyl-2-pyrrolidone, N-vinyl-2-piperidone and N-vinyl caprolactam.
7. The curable compound according to claim 6, wherein the N-vinyl lactam is N-vinyl-2-pyrrolidone.
8. The curable compound according to claim 1, wherein the first non-vinylester polymerisable compound is a monomer of formula (II) below:

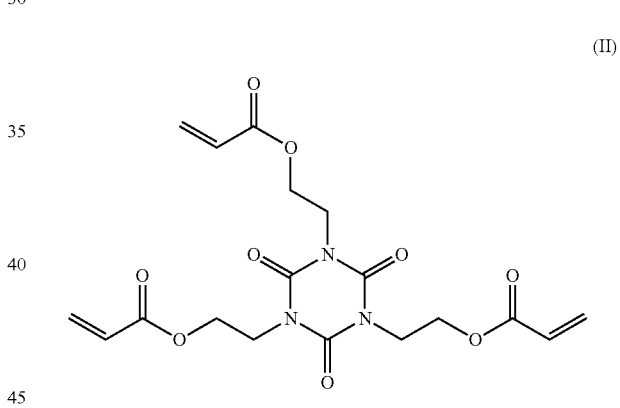

(II)

or an oligomer or a prepolymer resulting from a polymerisation of this monomer, or a blend thereof.
9. The curable compound according to claim 1, wherein the second non-vinylester polymerisable compound is a monomer of formula (III) below:

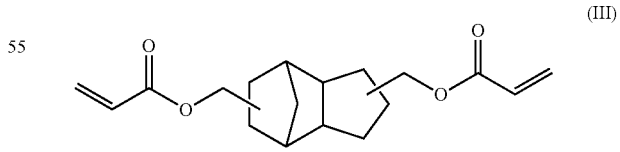

(III)

or an oligomer or a prepolymer resulting from a polymerisation of this monomer, or a blend thereof.
10. The curable composition according to claim 1, wherein the curable composition has the following qualitative and quantitative formulation, expressed as mass percentages:
33±5% of an epoxidised bisphenol A diacrylate monomer of formula (I) below:

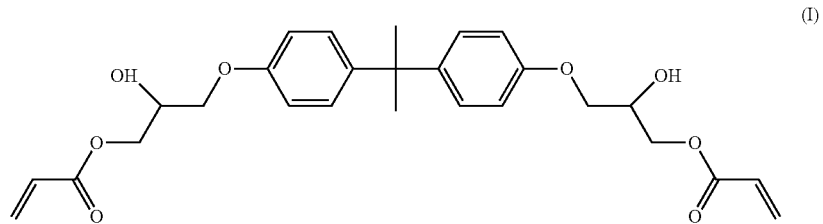 [SMILES: C=CC(=O)OCC(O)COc1ccc(C(C)(C)c2ccc(OCC(O)COC(=O)C=C)cc2)cc1]

(I)

or of an oligomer or of a prepolymer resulting from a polymerisation of this monomer, or a blend thereof;

10±3% of a polyethersulfone;

15±3% of N-vinyl-2-pyrrolidone;

40±5% of a monomer of formula (II) below:

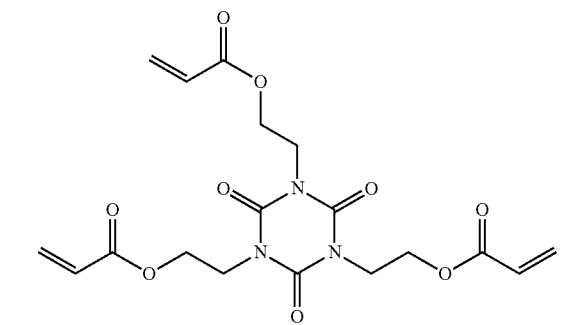

(II)

or of an oligomer or of a prepolymer resulting from a polymerisation of this monomer, or a blend thereof; and 2±1.5% of a monomer of formula (III) below:

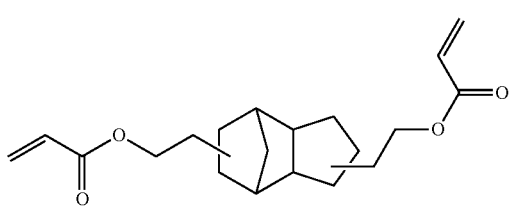

(III)

or of an oligomer or of a prepolymer resulting from a polymerisation of this monomer, or a blend thereof.

11. The curable composition according to claim 10, wherein the curable composition has the following qualitative and quantitative formulation, expressed as mass percentages:

33±1% of the epoxidised bisphenol A diacrylate monomer of formula (I) above, or of an oligomer or of a prepolymer resulting from a polymerisation of this monomer, or of a blend thereof;

10±1% of a polyethersulfone;

15±1% of N-vinyl-2-pyrrolidone;

40±1% of the monomer of formula (II) above, or of an oligomer or of a prepolymer resulting from a polymerisation of this monomer, or of a blend thereof; and 2±1% of the monomer of formula (III) above, or of an oligomer or of a prepolymer resulting from a polymerisation of this monomer, or of a blend thereof.

12. A material obtained by curing a curable composition comprising:

a vinylester polymerisable compound, jointly with a sulphonated polyaromatic thermoplastic polymer and an N-vinyl lactam, wherein the composition further comprises a first non-vinylester polymerisable compound which comprises at least one isocyanurate group bearing a at least two (meth)acrylate groups; and a second non-vinylester polymerisable compound which comprises at least one carbolycyclic or heteropolycyclic group bearing at least two (meth)acrylate groups.

13. The material according to claim 12, wherein said material is an adhesive enabling parts to be assembled with one another, wherein said parts made of composite materials.

14. The material according to claim 12, wherein said material is a matrix of composite material of a type including a matrix in which a reinforcement is contained.

15. A composite material, comprising:

a matrix in which a reinforcement is contained, wherein the matrix is obtained by curing a curable composition comprising:

a vinylester polymerisable compound, jointly with a sulphonated polyaromatic thermoplastic polymer and an N-vinyl lactam, wherein the composition further comprises a first non-vinylester polymerisable compound which comprises at least one isocyanurate group bearing a at least two (meth)acrylate groups; and a second non-vinylester polymerisable compound which comprises at least one carbolycyclic or heteropolycyclic group bearing at least two (meth)acrylate groups.

* * * * *